(12) United States Patent
Hasegawa et al.

(10) Patent No.: US 11,863,574 B2
(45) Date of Patent: Jan. 2, 2024

(54) INFORMATION PROCESSING APPARATUS, ANOMALY ANALYSIS METHOD AND PROGRAM

(71) Applicant: NIPPON TELEGRAPH AND TELEPHONE CORPORATION, Tokyo (JP)

(72) Inventors: Keita Hasegawa, Tokyo (JP); Takuma Koyama, Tokyo (JP); Yasushi Okano, Tokyo (JP); Masashi Tanaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/280,823

(22) PCT Filed: Oct. 10, 2019

(86) PCT No.: PCT/JP2019/040017
§ 371 (c)(1),
(2) Date: Mar. 26, 2021

(87) PCT Pub. No.: WO2020/075801
PCT Pub. Date: Apr. 16, 2020

(65) Prior Publication Data
US 2021/0409434 A1 Dec. 30, 2021

(30) Foreign Application Priority Data

Oct. 11, 2018 (JP) ................................ 2018-192415

(51) Int. Cl.
*H04L 9/40* (2022.01)
*H04W 12/122* (2021.01)
*H04W 4/46* (2018.01)

(52) U.S. Cl.
CPC .......... *H04L 63/1425* (2013.01); *H04W 4/46* (2018.02); *H04W 12/122* (2021.01)

(58) Field of Classification Search
CPC ............. H04L 63/1425; H04L 63/1416; H04L 63/1441; H04L 67/12; H04W 4/46;
(Continued)

(56) References Cited

U.S. PATENT DOCUMENTS

2016/0381066 A1 12/2016 Galula et al.
2018/0295147 A1 10/2018 Haga et al.
2018/0365124 A1 12/2018 Togawa

FOREIGN PATENT DOCUMENTS

EP        3016014 A1    5/2016
JP      2017-111796 A   6/2017
WO      2017104119 A1   6/2017

OTHER PUBLICATIONS

"Development of Automotive Intrusion Detection and Protection Systems against cyber-attack", Panasonic Automotive, [online], Internet<URL:https://news.panasonic.com/jp/press/data/2017/10/jn171010-2/jn171010-2.html>, With English Machine Translation.
(Continued)

*Primary Examiner* — Marcus Hammonds

(57) ABSTRACT

A storage processing unit configured to store, in a storage unit, first data output by a device or any one of multiple devices in association with a first feature context related to the first data, and an analyzing unit configured to obtain a second feature context related to second data in a case where the second data is received from the device or any one of the multiple devices, and analyze an anomaly of the received second data based on the received second data and the obtained second feature context and based on the first data and the first feature context stored in the storage unit, are provided.

11 Claims, 12 Drawing Sheets

(58) Field of Classification Search
CPC ... H04W 12/122; H04W 4/44; G06F 2201/81; G06F 11/0751; G06F 11/0793; G06F 17/40; G06F 21/552
See application file for complete search history.

(56) References Cited

OTHER PUBLICATIONS

European Patent Application No. 19871518.7, Extended European Search Report dated Mar. 28, 2022, 8 pages.

FIG.6A

| DATE AND TIME | VEHICLE ID | ELEMENT ID | Data[0] | Data[1] | Data[2] | Data[3] | Data[4] | ... |

FIG.6B

| DATE AND TIME | VEHICLE ID | ELEMENT ID | Acc_X | Acc_Y | Acc_Z | ... |
|---|---|---|---|---|---|---|

FIG.7

| DATE AND TIME | VEHICLE ID | ELEMENT ID | Data[0] | Data[1] | Data[2] | Data[3] | Data[4] | ... | ANOMALY SCORE |
|---|---|---|---|---|---|---|---|---|---|
| 0.57551 | AAAAA | xxx | ... | ... | ... | ... | ... | ... | ... |
| 0.58547 | AAAAA | xxx | ... | ... | ... | ... | ... | ... | ... |
| 0.59597 | AAAAA | xxx | ... | ... | ... | ... | ... | ... | ... |

FIG.8

| DATE AND TIME | VEHICLE ID | ELEMENT ID | Acc_X | Acc_Y | Acc_Z | ... | ANOMALY SCORE |
|---|---|---|---|---|---|---|---|
| 0.57551 | AAAAA | yyy | ... | ... | ... | ... | ... |
| 0.58547 | AAAAA | yyy | ... | ... | ... | ... | ... |
| 0.59597 | AAAAA | yyy | ... | ... | ... | ... | ... |

FIG.10

| DATE AND TIME | VEHICLE ID | ELEMENT ID | ANOMALY SCORE | SPATIAL FEATURE CONTEXT | TEMPORAL FEATURE CONTEXT | BEHAVIORAL FEATURE CONTEXT | ... | COUNTER-MEASURE |
|---|---|---|---|---|---|---|---|---|
| 0.57551 | AAAAA | yyy | ... | ... | ... | ... | ... | ... |
| 0.58547 | AAAAA | yyy | ... | ... | ... | ... | ... | ... |
| 0.59597 | AAAAA | yyy | ... | ... | ... | ... | ... | ... |

INFORMATION PROCESSING APPARATUS, ANOMALY ANALYSIS METHOD AND PROGRAM

CROSS-REFERENCE TO RELATED APPLICATIONS

This application is a U.S. 371 Applications of International Patent Application No. PCT/JP2019/040017, filed on 10 Oct. 2019, which application claims priority to and the benefit of JP Application No. 2018-192415, filed on 11 Oct. 2018, the disclosures of which are hereby incorporated herein by reference in their entireties.

TECHNICAL FIELD

The present invention relates to an information processing apparatus, an anomaly analysis method, and a program.

BACKGROUND ART

In connected cars (vehicles connected to external networks), which are expected to become popular in the future, it is expected that a software update of an electronic control unit (ECU), which is an operation performed at a dealer conventionally after a vehicle is brought to the dealer, will be wirelessly performed, for example, thereby improving convenience.

With respect to the above, similarly with conventional IT devices, a concern that vehicles and control devices of the vehicles may be subjected to cyber-attacks from malicious attackers as a result of being connected to external networks has been raised. There is also research showing that an attacker can hijack control of a vehicle by illegally gaining access from an external network and altering an ECU actually mounted in the vehicle.

For such a concern, various countermeasure techniques performed in advance are under consideration, but there is no countermeasure technique that completely prevents the risk of cyber-attacks. Therefore, it is necessary to consider a countermeasure that can be effectively performed after cyber-attacks occur, just in case. If an attack to take control of a vehicle by altering an ECU is considered, in order to take a countermeasure in the vehicle, there is a technique of continuously monitoring communication occurring in an in-vehicle network and detecting an anomaly. In general, however, there are many cases where calculation resources of in-vehicle devices are not sufficient, and it is usually difficult to apply an anomaly detection technique that requires a large calculation load.

Therefore, in recent years, rather than handling cyber-attacks by using a vehicle alone, a technology to handle cyber-attacks by using both cloud computing and a vehicle and using server-client cooperation in which processing with high computational load is performed in the cloud, and in which processing with low computational load and processing requiring a small delay are performed in an in-vehicle device, is being studied (e.g., Non-Patent Document 1).

RELATED ART DOCUMENTS

Non-Patent Documents

Non-Patent Document 1: "Panasonic Develop Automotive Intrusion Detection and Prevention Systems against Cyber Attacks", [online], Internet<URL:https://news.panasonic.com/jp/press/data/2017/10/jn171010-2/jn171010-2.html>

SUMMARY OF INVENTION

Problem to be Solved by the Invention

Anomalies such as cyber-attacks on a vehicle are usually an extremely small number of events considering the total number of detected events. That is, detection results usually include false positive results caused by operational errors, changes in settings, changes in environmental factors, or the like. When an anomaly that may be a cyber-attack is detected, it is necessary to perform an analysis, such as determining a countermeasure to be performed in accordance with a detection result. However, there is a problem that the above-described false detection increases the cost of analysis.

Here, the above-mentioned problem is not limited to vehicles, but is a common problem to be solved for various devices connected to a network.

The present invention has been made in view of the above, and aims to reduce the cost of analyzing data output by a device.

Means for Solving the Problem

In order to solve the above-described problem, an information processing apparatus includes a storage processing unit configured to store, in a storage unit, first data output by a device or any one of a plurality of devices in association with a first feature context related to the first data, and an analyzing unit configured to obtain a second feature context related to second data in a case where the second data is received from the device or any one of the plurality of devices, and analyze an anomaly of the received second data based on the received second data and the obtained second feature context and based on the first data and the first feature context stored in the storage unit.

Advantage of the Invention

The cost of analyzing data output by a device can be reduced.

BRIEF DESCRIPTION OF DRAWINGS

FIG. 6A is a drawing illustrating an example configuration of the log;

FIG. 6B is a drawing illustrating an example configuration of the log;

FIG. 7 is a drawing illustrating an example configuration of a control log DB 271;

FIG. 8 is a drawing illustrating an example configuration of a sensor log DB 272;

FIG. 10 is a drawing illustrating an example configuration of a feature knowledge DB 173.

EMBODIMENTS OF THE INVENTION

Figure 1:
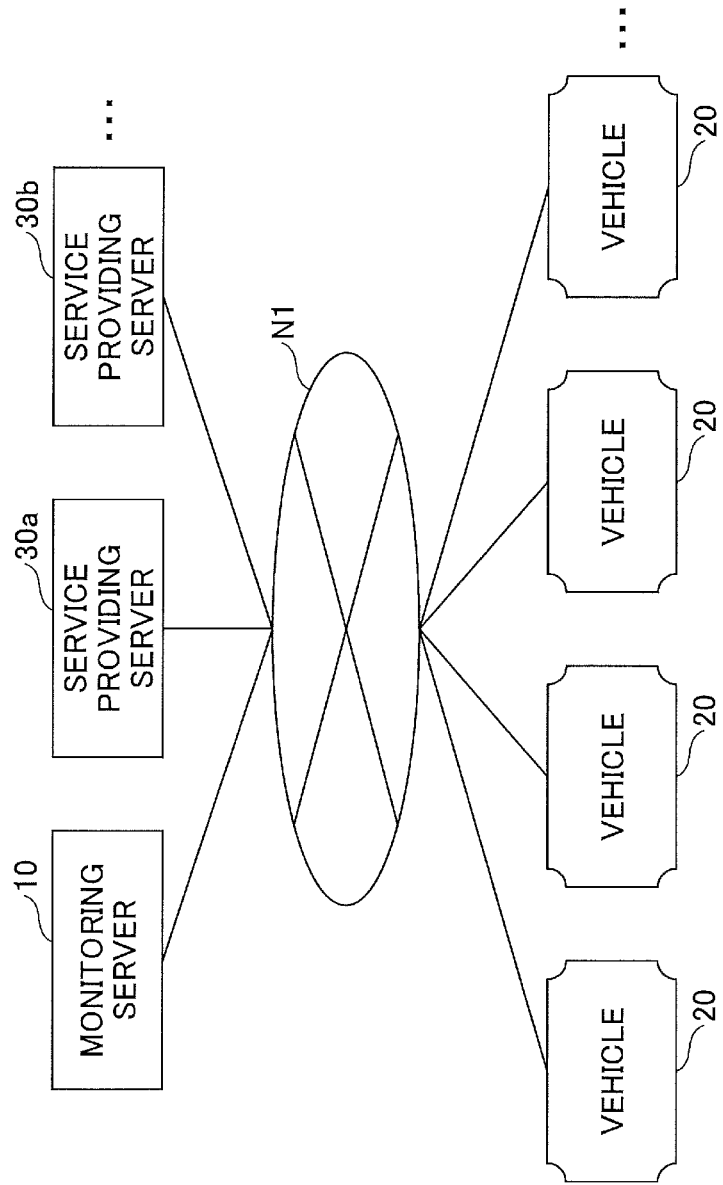
FIG. 1 is a drawing illustrating an example of a system configuration according to an embodiment of the present invention.

In the following, an embodiment of the present invention will be described with reference to the drawings. FIG. 1 is a drawing illustrating an example of a system configuration according to the embodiment of the present invention. In FIG. 1, multiple vehicles 20 are cars (i.e., connected cars) connected to various servers (e.g., a monitoring server 10, a service providing server 30*a*, and a service providing server 30*b*) through a network N1 such as the Internet. For example, each vehicle 20 connects to the network N1 through a wireless network such as a mobile communication network, and communicates with various servers.

The service providing server 30*a*, the service providing server 30*b*, and the like (which will be hereinafter referred to as the "service providing server 30" if they are not distinguished) are one or more computers that provide a predetermined service, to the vehicle 20 or based on information collected from the vehicle 20. For example, the service providing server 30*a* may provide telematics services. The service providing server 30*b* may also provide services based on data collected from each vehicle 20.

The monitoring server 10 is one or more computers that detect the occurrence of an anomaly in the vehicle 20 and analyze contents of the anomaly based on data transmitted (or uploaded) from the vehicle 20. An example of the anomaly is a network-based cyber-attack against the vehicle 20.

Figure 2:
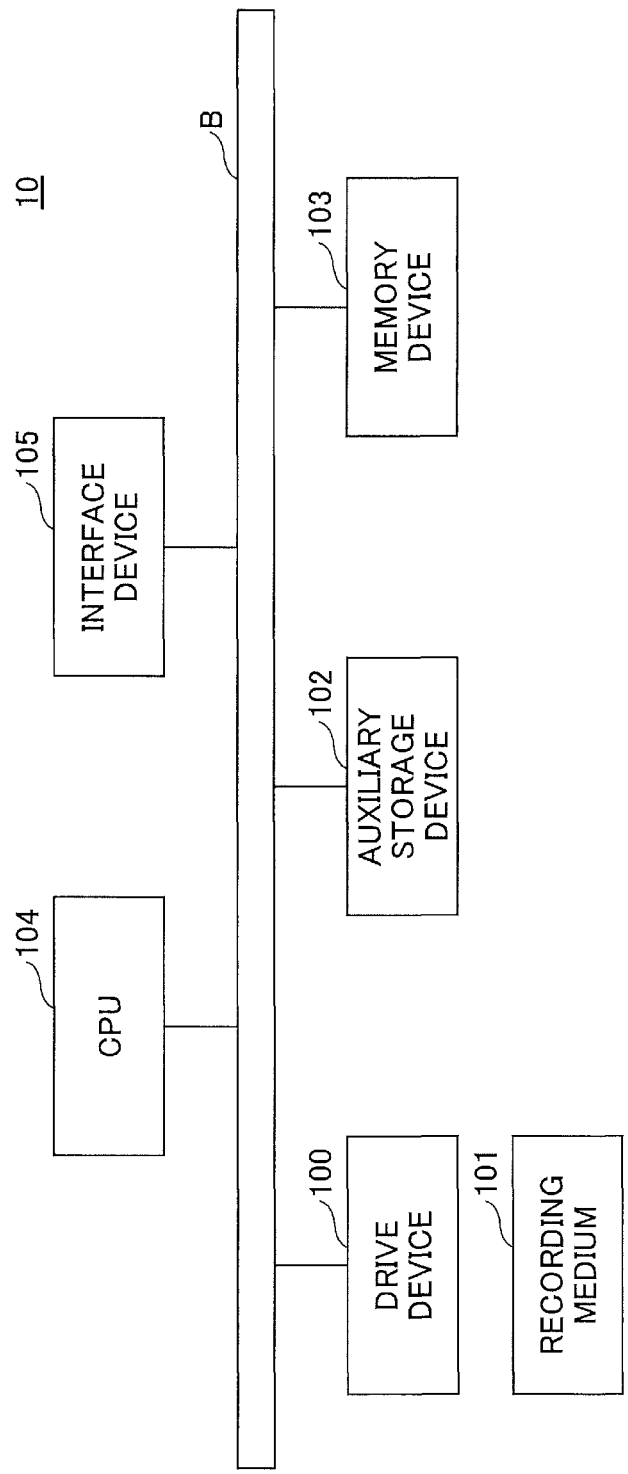
FIG. 2 is a drawing illustrating an example of a hardware configuration of a monitoring server 10 according to the embodiment of the present invention.

FIG. 2 is a drawing illustrating an example of a hardware configuration of the monitoring server 10 according to the embodiment of the present invention. In FIG. 2, the monitoring server 10 includes a drive device 100, an auxiliary storage device 102, a memory device 103, and a CPU 104, an interface device 105, each of which is interconnected through a bus B.

A program for achieving a process in the monitoring server 10 is provided by a recording medium 101 such as a CD-ROM. When the recording medium 101 in which the program is stored is set in the drive device 100, the program is installed in the auxiliary storage device 102 from the recording medium 101 through the drive device 100. However, the program is not necessarily required to be installed from the recording medium 101, and the program may be downloaded from another computer through the network. The auxiliary storage device 102 stores the installed program and stores necessary files, data, and the like.

The memory device 103 reads out and stores the program from the auxiliary storage device 102 in response to an instruction to start the program. The CPU 104 performs functions related to the monitoring server 10 by executing the program stored in the memory device 103. The interface device 105 is used as an interface for connecting to a network.

Figure 3:
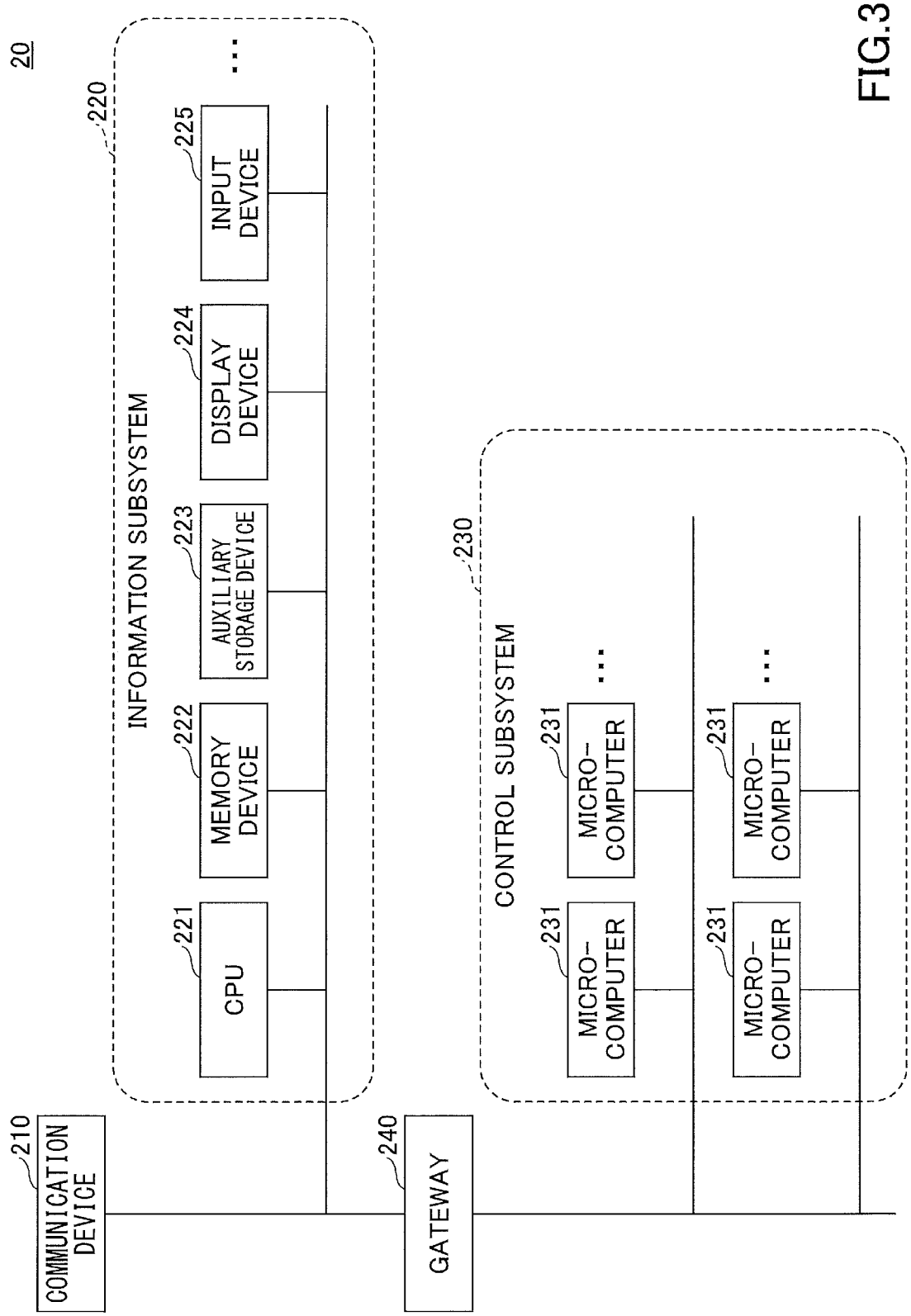
FIG. 3 is a drawing illustrating an example of a hardware configuration of a vehicle 20 according to the embodiment of the present invention.

FIG. 3 is a drawing illustrating an example of a hardware configuration of the vehicle 20 according to the embodiment of the present invention. In FIG. 3, the vehicle 20 includes a communication device 210, an information subsystem 220, a control subsystem 230, and a gateway 240.

The communication device 210 includes a communication module for connecting to the network N1, a communication module for communicating with other vehicles 20, devices on the road, or the like, and a communication module for connecting to smartphones or the like through a wireless LAN or near-range wireless communication.

The information subsystem 220 is a unit of performing information processing according to the installed program and includes a CPU 221, a memory device 222, an auxiliary storage device 223, a display device 224, and an input device 225. The auxiliary storage device 223 stores the installed program and various data used by the program. The memory device 222 reads out and stores a program to be started from the auxiliary storage device 223. The CPU 221 performs functions related to the information subsystem 220 according to the program stored in the memory device 222. The display device 224 displays a programmed graphical user interface (GUI) or the like. The input device 225 is an operational component such as a button or a touch panel and is used to input various operational instructions. For example, an in-vehicle device such as a car navigation system and a head unit of a car audio is an example of the information subsystem 220.

The control subsystem 230 is a unit of controlling a behavior of the vehicle 20 and includes multiple microcomputers 231 for various controls. For example, an electronic control unit (ECU) is an example of the microcomputer 231.

The gateway 240 is a gateway (e.g., a central gateway (CGW)) for connecting the information subsystem 220 to the control subsystem 230. That is, a communication protocol used in the information subsystem 220 is, for example, an IP protocol, and a communication protocol used in communication between the microcomputers 231 in the control subsystem 230 is a non-IP protocol specialized for control (e.g., a controller area network (CAN)). Thus, the gateway 240 is provided to absorb differences in these communication protocols.

Here, the hardware configuration illustrated in FIG. 3 is provided merely as an example. The hardware configuration of the vehicle 20 is not limited to a particular one, as long as the following functions can be achieved.

Figure 4:
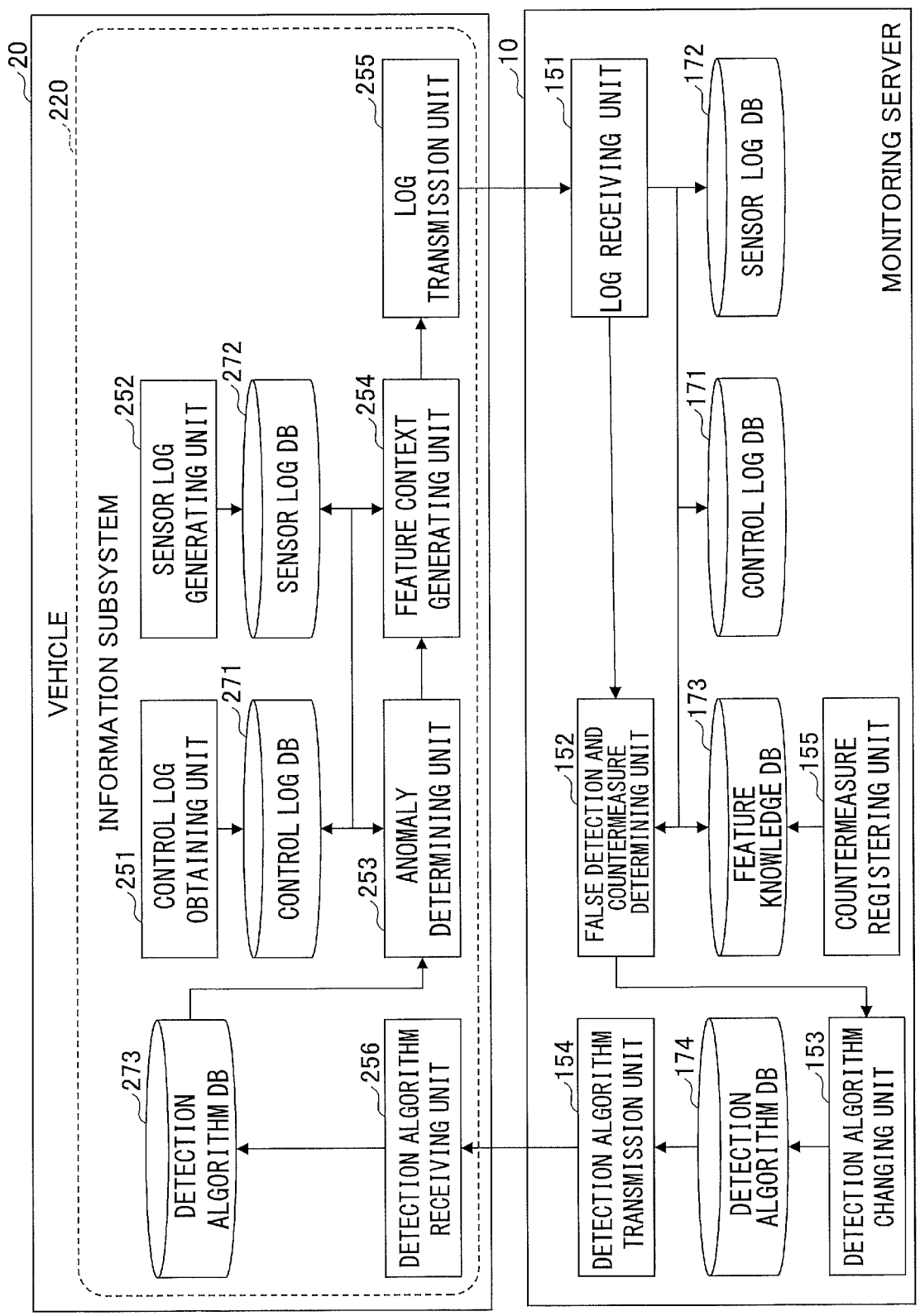
FIG. 4 is a drawing illustrating an example of a functional configuration of the vehicle 20 and the monitoring server 10 according to the embodiment of the present invention.

FIG. 4 is a drawing illustrating an example of a functional configuration of the vehicle 20 and the monitoring server 10 according to the embodiment of the present invention. In FIG. 4, the information subsystem 220 of the vehicle 20 includes a control log obtaining unit 251, a sensor log generating unit 252, an anomaly determining unit 253, a feature context generating unit 254, a log transmission unit 255, and a detection algorithm receiving unit 256. Each of these components is achieved by a process in which one or more programs installed in the information subsystem 220 cause the CPU 221 to execute processing. Additionally, the information subsystem 220 includes databases (i.e., storage units) such as a control log DB 271, a sensor log DB 272, and a detection algorithm DB 273. Each of these databases (i.e., storage units) can be achieved by using, for example, a memory device 222 or an auxiliary storage device 223.

The control log obtaining unit 251 obtains a control log and stores (or records) the control log in the control log DB 271. The control log indicates log data related to communication performed by each microcomputer 231 in the control subsystem 230. Data of communication contents itself may be used as the control log. Thus, the control log is generated every time any microcomputer 231 performs communication. The contents of the communication indicate, for example, control of the vehicle 20, information of infotainment such as an audio and a car navigation system, and communication related to an indicator display inside the vehicle 20.

The sensor log generating unit 252 generates a sensor log and stores the sensor log in the sensor log DB 272. The sensor log indicates log data including data (e.g., measurement values obtained by sensors) obtained from sensors provided at various positions in the vehicle 20 (e.g., an accelerometer and a global positioning system (GPS)). The data is obtained from each sensor, and the sensor log based on the data is generated, for example, in a constant period or at timings of the occurrence of a particular event. The timings of generating the sensor log for each sensor may differ. Some sensors among all the sensors included in the vehicle 20 may generate the sensor log.

The anomaly determining unit 253 determines the degree (or level) of anomaly by using a detection algorithm stored in the detection algorithm DB 273 based on the control log and the sensor log (which will be hereinafter simply referred to as the "log", if the respective logs are not distinguished). Specifically, the anomaly determining unit 253 calculates an index value (which will be hereinafter referred to as an "anomaly score") indicating the degree of anomaly in the log generated from the vehicle 20. However, only the control log may be used to calculate the anomaly score, or only the sensor log may be used to calculate the anomaly score. The calculated anomaly score is stored in the control log DB 271 or in the sensor log DB 272.

The feature context generating unit 254 generates information related to the log (which will be hereinafter referred to as "a feature context") indicating an external environment of the vehicle 20, and a state of the vehicle 20 when the log is obtained or generated. For example, when the anomaly score is calculated, the feature context generating unit 254 generates a feature context indicating the time when the log is obtained or generated, the external environment of the vehicle 20, and a state of the vehicle 20. The feature context may be generated based on a log stored in the control log DB 271 or the sensor log DB 272 or may be generated based on the information obtained from the communication device 210.

When the timing of transmission (or an upload) to the monitoring server 10 (which will be hereinafter referred to as "transmission timing") has come, the log transmission unit 255 attaches the feature context to the log stored in the control log DB 271 or in the sensor log DB 272 and transmits the log and the feature context to the monitoring server 10.

The detection algorithm receiving unit 256 receives a change request of changing a detection algorithm distributed from the monitoring server 10 and changes (or updates) the detection algorithm DB 273 in accordance with the detection algorithm included in the change request.

The monitoring server 10 includes a log receiving unit 151, a false detection and countermeasure determining unit 152, a detection algorithm changing unit 153, a detection algorithm transmission unit 154, and a countermeasure registering unit 155. Each of these units is achieved by a process in which one or more programs installed in the monitoring server 10 cause the CPU 104 to execute processing. The monitoring server 10 uses databases (i.e., storage units) such as a control log DB 171, a sensor log DB 172, a feature knowledge DB 173, and a detection algorithm DB 174. Each of these databases (or storage units) can be achieved using, for example, the auxiliary storage device 102 or a storage device that can be connected to the monitoring server 10 through a network.

The log receiving unit 151 receives a log transmitted (or uploaded) from the vehicle 20 and stores the log in the control log DB 171 or the sensor log DB 172. The log receiving unit 151 stores identification information of the microcomputer 231 or the sensor from which the log is output, the anomaly score and the feature context of the log, and the like in the feature knowledge DB 173.

The false detection and countermeasure determining unit 152 analyzes an anomaly in the log received by the log receiving unit 151. If the anomaly determining unit 253 of the vehicle 20 detects an anomaly, the false detection and countermeasure determining unit 152 determines whether the anomaly is caused by a false detection of the anomaly determining unit 253. Specifically, the false detection and countermeasure determining unit 152 extracts, from the feature knowledge DB 173, a past record that is identical or similar to a set of the log and the feature context received by the log receiving unit 151. The past record may relate to a different vehicle or to the same vehicle (i.e., a past record obtained at a different time). Additionally, the past record that is identical or similar may be a past record in which only the log is identical or similar, or a past record in which only the feature context is identical or similar. If the past record that is identical or similar has already been analyzed as normal, and the anomaly score in the feature knowledge DB 173 is set as a value less than an anomaly detection threshold value, the false detection and countermeasure determining unit 152 determines that the anomaly is over-detected by the anomaly determining unit 253 even if the anomaly of the log is detected in the anomaly determining unit 253. If the false detection and countermeasure determining unit 152 determines that the anomaly is over-detected, the false detection and countermeasure determining unit 152 may request the detection algorithm changing unit 153 to change the detection algorithm.

If a countermeasure to the past record that is identical or similar to the received log is registered in the feature knowledge DB 173, the false detection and countermeasure determining unit 152 performs the countermeasure with respect to the log. Examples of the countermeasure include changing the anomaly score in the feature knowledge DB 173 by treating the detected anomaly as a false detection, changing the detection algorithm, and the like. With respect to the above, if there is no past record that is identical or similar in the feature knowledge DB 173 or there is no countermeasure, a warning indicating that a detailed analysis is required may be output.

The detection algorithm changing unit 153 changes some or all of the detection algorithms stored in the detection algorithm DB 174 in response to a request from the false detection and countermeasure determining unit 152. The detection algorithm DB 174 stores the detection algorithm distributed to each vehicle 20.

The detection algorithm transmission unit 154 distributes a change request including a detection algorithm changed by the detection algorithm changing unit 153 to each vehicle 20.

The countermeasure registering unit 155 registers a countermeasure input by an analyst or the like in the feature knowledge DB 173 in response to the warning indicating that a detailed analysis is required from the false detection and countermeasure determining unit 152.

In FIG. 4, an example in which the calculation of the anomaly score and the generation of the feature context are performed in the vehicle 20 is described. However, the calculation of the anomaly score or the generation of the feature context may be performed in the monitoring server 10. Additionally, the anomaly score or the feature context may be manually input by an analyst or the like.

When the calculation of the anomaly score is performed by the monitoring server 10, the log transmission unit 255 transmits the log to the monitoring server 10 when the transmission timing has come. The anomaly determining unit (which is not illustrated) of the monitoring server 10 calculates the anomaly score as in the anomaly determining unit 253 of the vehicle 20 and stores the anomaly score in the control log DB 171 or the sensor log DB 172.

When the feature context is generated in the monitoring server 10, a feature context generating unit of the monitoring server 10 (which is not illustrated) generates the feature context as in the feature context generating unit 254 of the vehicle 20 and stores the feature context in the feature knowledge DB 173. The feature context may be generated based on the log stored in the control log DB 171 or the sensor log DB 172 of the monitoring server 10 and may be generated based on information obtained through the interface device 105.

Figure 5:
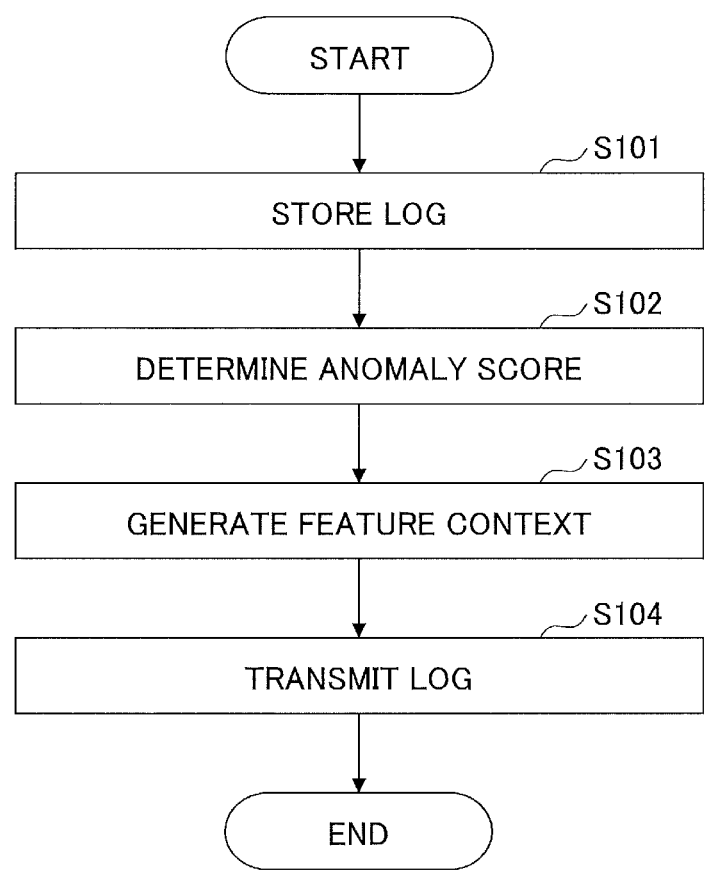
FIG. 5 is a flowchart for describing an example of a processing procedure when a log is generated.

In the following, a processing procedure performed by the information subsystem 220 of the vehicle 20 will be described. FIG. 5 is a flowchart for describing an example of a processing procedure when the log is generated.

When the control log obtaining unit 251 obtains the control log or the sensor log generating unit 252 generates the sensor log, either the control log or the sensor log (which will be hereinafter referred to as a "target log") is stored in the control log DB 271 or the sensor log DB 272 (S101).

FIG. 6A and FIG. 6B are drawings illustrating an example configuration of the log. FIG. 6A illustrates an example of the control log. The control log includes date and time, vehicle ID and element ID, and Data[0], Data[1], Data[2], Data[3], Data[4], . . . , etc. (which will be hereinafter referred to as "Data[ ]"). The date and time are the date and time when the control log has been obtained (i.e., the date and time when communication related to the control log has been performed). The vehicle ID is identification information of the vehicle 20. The element ID is identification information of a component element of the vehicle 20. The element ID in the control log is identification information of the microcomputer 231 that has performed communication related to the control log. Data[ ] is data included in the communication. For example, if the communication is related to the control of the engine, a value of each parameter related to the control of the engine is a corresponding value of Data[ ]. However, data such as checksums and counters may be included in Data[ ], as well as the values of the parameters related to the control of the engine.

With respect to the above, FIG. 6B illustrates an example of the sensor log. The sensor log includes date and time, vehicle ID and element ID, and data specific to a sensor related to the sensor log. The date and time are the date and time when the sensor log has been generated. The vehicle ID is identification information of the vehicle 20. The element ID is identification information of the sensor from which data related to the sensor log is output. Since the sensor log in FIG. 6B is based on data obtained from the acceleration sensor, the sensor log includes Acc_X, Acc_Y, and Acc_Z, as data specific to the acceleration sensor. Acc_X, Acc_Y, and Acc_Z are acceleration in the X-axis direction, acceleration in the Y-axis direction, and acceleration in the Z-axis direction, respectively.

FIG. 7 is a drawing illustrating an example configuration of the control log DB 271. As illustrated in FIG. 7, each record of the control log DB 271 includes items illustrated in FIG. 6A and the anomaly score. Among these items, there is no value for the anomaly score at step S101. This is because the value of the anomaly score is determined in step S102.

FIG. 8 is a drawing illustrating an example configuration of the sensor log DB 272. As illustrated in FIG. 8, each record of the sensor log DB 272 includes items illustrated in FIG. 6B and the anomaly score. Among these items, at step S101, there is no value for the anomaly score for the same reason as the control log DB 271. The format of the sensor log differs in each sensor. For example, a GPS receiver sensor log may include latitude and longitude. Therefore, the sensor log may be stored in a different table of the sensor log DB 272 separately for each sensor (i.e., for each element ID).

The anomaly determining unit 253 determines (or calculates) the anomaly score of the target log and stores the anomaly score in the control log DB 271 or the sensor log DB 272 (S102). The anomaly score may be determined in a constant period, in response to the occurrence of a log including a particular value, or every time a certain size of a log required to determine the anomaly is stored.

The determination (or calculation) of the anomaly score of the target log can be performed using known techniques. For example, the anomaly score may be determined based on communication intervals between the microcomputers 231 and data values output by the microcomputers 231. For example, the anomaly score may be determined by inputting the target log into a learned model (e.g., a neural network) that receives the log and outputs the anomaly score. The anomaly score may be 0 or 1 indicating the presence or absence of the anomaly, or the anomaly score may be a value indicating the degree of anomaly in a range from the minimum value (e.g., 0) to the maximum value (e.g., 1). Additionally, the anomaly score may not be determined using both the control log and the sensor log. For example, only either the control log or the sensor log may be used to determine the anomaly score.

The feature context generating unit 254 generates a feature context related to the target log when the anomaly score is determined in the anomaly determining unit 253 (S103). The feature context generating unit 254 not only may generate the feature context if the anomaly score of the target log is greater than or equal to the anomaly detection threshold value, that is, may generate the feature context if the target log is detected as an anomaly, but also may generate the feature context if the anomaly score of the target log is less than the anomaly detection threshold value, that is, if the target log is detected as normal.

The feature context generating unit 254 generates a spatial feature context indicating the external environment of the vehicle 20, a temporal feature context indicating the time when the log has been obtained or generated, a behavioral feature context indicating the behavior of the vehicle 20, and the like. Additionally, a traffic domain dependent context representing information about a traffic condition of the vehicle 20, a vehicle domain dependent context representing information about a state of the vehicle 20, and the like may be generated.

Examples of the spatial feature context are weather, a location, an obstacle, a temperature, rainfall, humidity, atmospheric pressure, wind speed, and the like. Examples of the temporal feature context are time, a day of the week, a season, an event, and the like. Examples of the behavioral feature context are the speed, the acceleration, the angular speed, and the like obtained from the sensor of the vehicle 20, the sensor of another vehicle, and the like. Examples of the traffic domain dependent context are a travel route, a road condition, a traffic flow, a gradient, an elevation, the width of a road, a lane, and the like. Examples of the vehicle domain dependent context are a vehicle type, a model year, a car option, a failure history, a mounting ECU, an attack history, attack campaign information, and the like. Here, the classification of these feature contexts is merely for convenience. For example, the temperature, the rainfall, the humidity, the atmospheric pressure, the wind speed, and the like may be classified in the temporal feature context, and the gradient, the elevation, and the like may be classified in the spatial feature context. Additionally, any combination of the above-described feature contexts may be used, and another feature context may be used.

For example, when information such as the weather and the air temperature can be obtained from a smartphone, an external server, or the like through the communication device 210, the feature context generating unit 254 generates the spatial feature context indicating a weather environment. For example, the feature context generating unit 254 generates the spatial feature context indicating the location of the vehicle 20 from a sensor log of a GPS receiver stored in the sensor log DB 272. For example, the feature context generating unit 254 generates the behavioral feature context indicating the speed and acceleration of the vehicle 20 by using the sensor log of the GPS receiver stored in the sensor log DB 272 and the control log of the vehicle speed stored in the control log DB 271. Each feature context may be generated as an instantaneous value or as a continuous or discrete value within a period of time.

When the transmission timing arrives, the log transmission unit 255 assigns the feature context to the target log and transmits the target log to the monitoring server 10 (S104). The log transmission unit 255 may transmit both a log detected as an anomaly (i.e., a log whose anomaly score is greater than or equal to the anomaly detection threshold value) and a log detected as normal (i.e., a log whose anomaly score is less than the anomaly detection threshold value) to the monitoring server 10, or may transmit a log detected as an anomaly and may not transmit a log detected as normal. The log transmission unit 255 may select a log to be transmitted based on a predetermined priority or standard.

The determination of the anomaly score (S102) and the generation of the feature context (S103) may be performed by the monitoring server 10 after the monitoring server 10 receives the target log.

Figure 9:
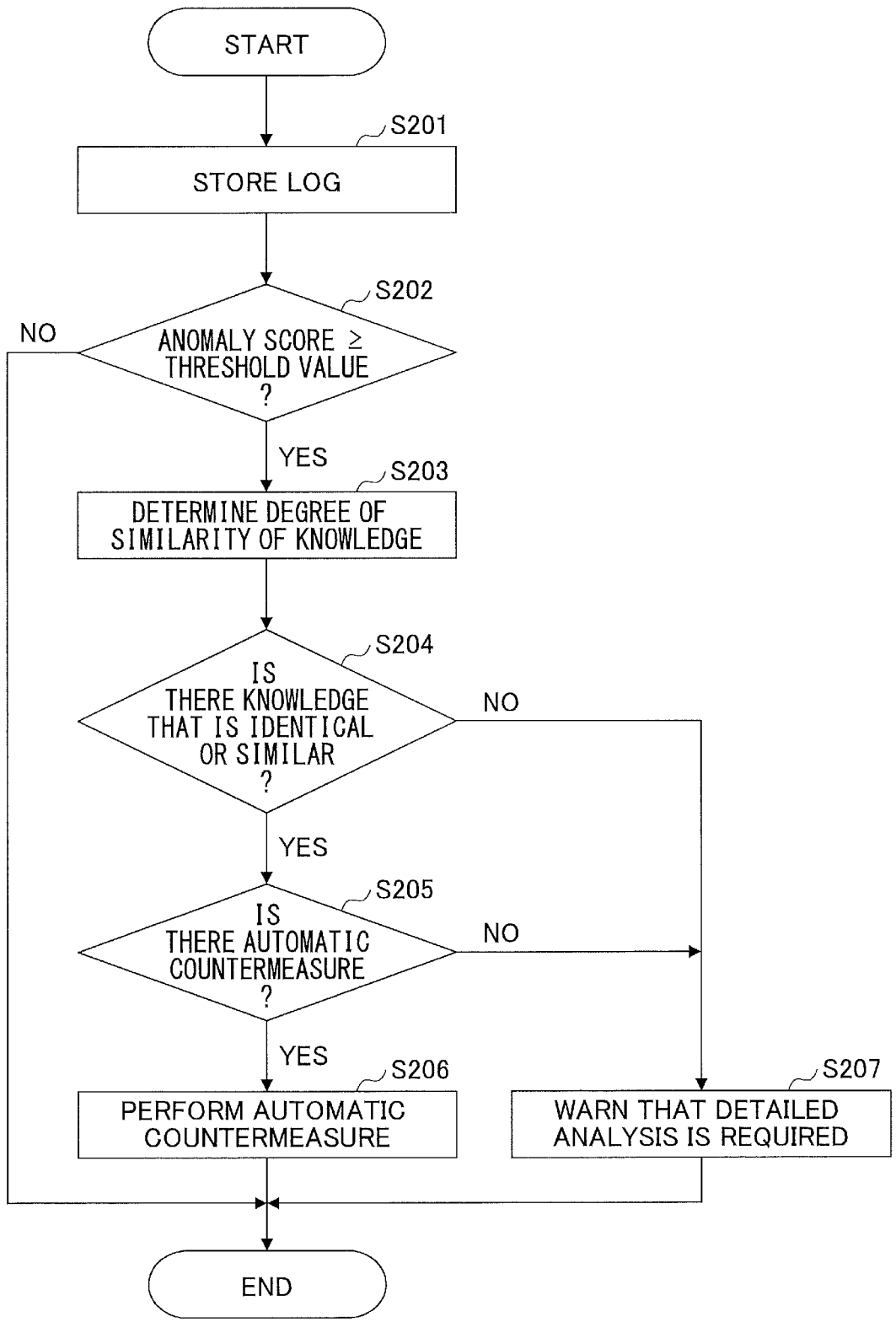
FIG. 9 is a flowchart for describing an example of a processing procedure when the log is received.

In the following, a processing procedure performed by the monitoring server 10 will be described. FIG. 9 is a flowchart for describing an example of the processing procedure when the log is received.

The log receiving unit 151 receives the target log together with the feature context, stores the target log in the control log DB 171 or the sensor log DB 172, and stores the feature context in the feature knowledge DB 173 (S201). The control log DB 171 and the sensor log DB 172 are configured in a manner similar to that in FIG. 7 and that in FIG. 8, respectively.

FIG. 10 is a drawing illustrating an example configuration of the feature knowledge DB 173. As illustrated in FIG. 10, each record of the feature knowledge DB 173 includes the feature contexts and the countermeasures in addition to the date and time, the vehicle ID, the element ID and the anomaly score in the control log DB 171 or the sensor log DB 172. As the feature context, the feature context received by the log receiving unit 151 is stored. No countermeasure is stored because the countermeasure is registered in step S303. Depending on a combination of the vehicle ID and the element ID, the vehicle 20 and the microcomputer 231 or the sensor from which the target log is output can be identified. A corresponding relationship between a record of the feature knowledge DB 173 and a record of the control log DB 171 or the sensor log DB 172 may be identified by a combination of the date and time, the vehicle ID, and the element ID, or may be identified by adding log ID representing the record of the control log DB 171 or the record of the sensor log DB 172 to the feature knowledge DB 173.

If the anomaly score is greater than or equal to the anomaly detection threshold value (S202: Yes), the following process is performed. Here, if the log transmission unit 255 of the vehicle 20 does not transmit a log whose anomaly score is less than the anomaly detection threshold value, the performing of step S202 is not necessary.

The false detection and countermeasure determining unit 152 determines (or calculates) the degree of similarity between the target log or the feature context and a past record stored in the feature knowledge DB 173 (S203). If the feature context is generated as a continuous value, the continuous value may be converted to a discrete value in order to determine the degree of similarity.

A method of making a determination of identical or similar may be performed using known techniques. For example, a perfect matching or a partial matching may be used. The degree of similarity may also be determined, for example, by inputting, into a learned model, the target log and the feature context together with a record that is in the feature knowledge DB 173. The learned model is, for example, a neural network, receives various logs and feature contexts, and outputs the respective degrees of similarity. In addition, a statistical processing, such as an outlier test, may be performed. The determination of whether the feature context is identical or similar may be performed across multiple feature contexts. If the determination is performed across multiple contexts, weights may be applied in accordance with the feature contexts.

If there is a past record that is identical or similar in the feature knowledge DB 173 (S204: Yes) and if there is a countermeasure that can be automatically performed with respect to the record in the feature knowledge DB 173 (S205: Yes), the false detection and countermeasure determining unit 152 performs the countermeasure (S206).

For example, the following description assumes that the anomaly determining unit 253 determines that the microcomputer 231 controlling the brake of the vehicle 20 is operating in a state of exceeding a threshold value, and, as a result, the behavioral feature context indicating the brake behavior is generated from the control log of the microcomputer 231, and the spatial feature context indicating the location of the vehicle 20 and the traffic domain dependent context indicating the occurrence of traffic congestion is generated from the sensor log of the GPS receiver, the sensor log of the camera or the distance sensor, information of the vehicle information and communication system (VICS) (registered trademark), and information obtained by Vehicle-to-Vehicle (V2V) or Vehicle-to-Infrastructure (V2I). Other feature contexts such as the vehicle domain dependent context indicating a state of the vehicle 20 are also generated, but a high weight is applied to the feature context related to the brake control. The weight is a coefficient that is added to the feature context in the determination of the anomaly that includes a false detection, and may be, for example, a logarithmic coefficient to the feature context. Here, in order to focus on the degrees of similarity in the behavioral feature context, the spatial feature context, and the traffic domain dependent context, high weights are applied to these feature contexts. The false detection and countermeasure determining unit 152 searches a past record that is identical or similar from the feature knowledge DB 173. If the anomaly score of the past record that is identical or similar is less than the anomaly detection threshold value, the false detection and countermeasure determining unit 152 determines that a false detection has occurred due to the traffic congestion and updates the value of the anomaly score related to the control log of the microcomputer 231 in the feature knowledge DB 173. Additionally, if a countermeasure that can be automatically performed is set to a past record that is identical or similar, the false detection and countermeasure determining unit 152 performs the countermeasure.

For example, the following description assumes that the anomaly determining unit 253 determines that the microcomputer 231 controlling a wiper of the vehicle 20 is operating in a state of exceeding a threshold value, and as a result, the behavioral feature context indicating the behavior of the wiper is generated from the control log of the microcomputer 231, the spatial feature context indicating that the weather is rain is generated from the external server, and the vehicle domain dependent context indicating the vehicle type is generated. Here, in order to focus on the degrees of similarity of the behavioral feature context, the spatial feature context, and the vehicle domain dependent context with respect to the wiper control, high weights are applied to these feature contexts. The false detection and countermeasure determining unit 152 searches a past record that is identical or similar from the feature knowledge DB 173. If the anomaly score of the past record that is identical or similar is less than the anomaly detection threshold value, the false detection and countermeasure determining unit 152 determines that the false detection has occurred due to an inappropriate threshold value for determining the anomaly of the wiper, and updates the value of the anomaly score related to the control log of the microcomputer 231 in the feature knowledge DB 173. Additionally, if a countermeasure that can be automatically performed is set to the past record that is identical or similar, the false detection and countermeasure determining unit 152 performs the countermeasure.

With respect to the above, if there is no record that is identical or similar in the feature knowledge DB 173 (S204: No), or if there is no countermeasure that can be automatically performed with respect to the record in the feature knowledge DB 173 (S205: No), the false detection and countermeasure determining unit 152 outputs a warning indicating that a detailed analysis is required because of an unknown detection (S207). The warning may be notified by the monitoring server 10 to another analyzer, an analyst, or the like.

In the example of the anomaly detection of the microcomputer 231 controlling the brake or the example of the anomaly detection of the microcomputer 231 controlling the wiper as described above, if the false detection and countermeasure determining unit 152 cannot determine whether a false detection has occurred, the false detection and countermeasure determining unit 152 requests another analyzer, an analyst, or the like to perform a detailed analysis.

Another analyzer, an analyst, or the like analyzes the anomaly with reference to the log stored in the control log DB 171 or the sensor log DB 172 and the feature context stored in the feature knowledge DB 173. Since the feature context is assigned to the log, it can also be determined whether there is a possibility of a large-scale anomaly (i.e., an anomaly across multiple vehicles 20) such as a cyber-attack. The method of analyzing the occurrence of such an anomaly is not limited to a predetermined method. For example, the analysis may be performed based on a learned model (such as a neural network) or the analysis may be performed using another known technique. Additionally, information such as a report from a computer emergency response team (CERT) of an automobile company, a report from a security operation center (SOC) owned by another company, and a report from a security vendor may be used to determine whether there is a possibility of the occurrence of an anomaly.

In accordance with the result of the analysis of another analyzer, an analyst, or the like, the countermeasure is determined. For example, for a log that is determined to be a false detection, a countermeasure that changes the detection algorithm so as not to detect the log as the anomaly is determined. For example, for a log that is determined not to be a false detection, a countermeasure such as checking or repairing a failure and updating software of the microcomputer 231, the auxiliary storage device 223, and the like is determined.

Figure 11:
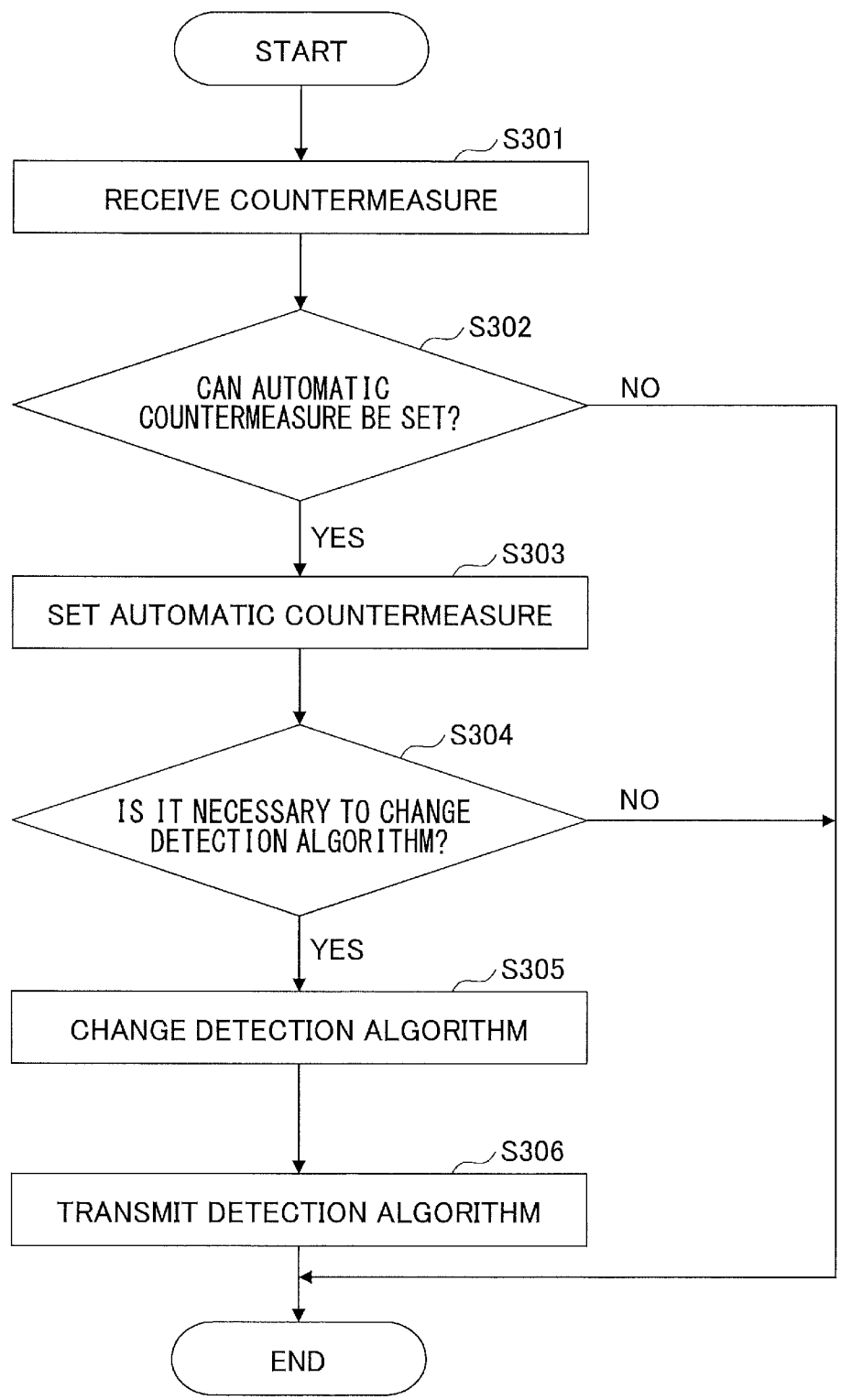
FIG. 11 is a flowchart for describing an example a processing procedure of determining a countermeasure.

In the following, a processing procedure performed by the monitoring server 10 after completion of analysis by another analyzer, an analyst, or the like will be described. FIG. 11 is a flowchart for describing an example of a processing procedure when the countermeasure is determined.

The countermeasure registering unit 155 receives a countermeasure determined by another analyzer, an analyst, or the like (S301). There is a countermeasure that can be automatically performed and there is a countermeasure that cannot be automatically performed because an inspection, a repair, or the like performed by a dealer is required. The countermeasures that can be automatically performed include, for example, changing the detection algorithm used by the anomaly determining unit 253, treating the detection as a false detection, notifying a predetermined contact such as the owner of the vehicle 20, and the like.

If the countermeasure registering unit 155 receives a countermeasure that can be automatically performed (S302: Yes), the countermeasure registering unit registers the countermeasure in the feature knowledge DB 173 (S303). Here, for a countermeasure that cannot be automatically performed, a piece of content indicating that the countermeasure cannot be automatically performed may also be registered in the feature knowledge DB 173.

If the countermeasure that changes the detection algorithm is registered in the feature knowledge DB 173 (S304: Yes), the false detection and countermeasure determining unit 152 requests the detection algorithm changing unit 153 to change the detection algorithm, and the detection algorithm changing unit 153 changes the detection algorithm stored in the detection algorithm DB 174 (S305). The change of the detection algorithm includes a change of the extraction method of the feature amount used by the anomaly determining unit 253, a change of the weight applied to the feature amount, an adjustment of the threshold value, setting of a whitelist indicating a condition that is not considered to be an anomaly, and the like.

The detection algorithm transmission unit 154 transmits the detection algorithm to the vehicle 20 through the interface device 150, such as a wireless device (S306). The transmission of the detection algorithm may be performed periodically or in response to the change of the detection algorithm. The detection algorithm transmission unit 154 notifies a predetermined contact such as the owner of the vehicle 20 that the detection algorithm in the vehicle 20 is required to be updated, and the detection algorithm in the vehicle 20 may be updated by a dealer or the like. The detection algorithm receiving unit 256 of the vehicle 20 receives the detection algorithm and changes the detection algorithm DB 273. The changed detection algorithm is used to determine the anomaly score in step S102 of FIG. 5.

As described above, in the present embodiment, since the feature context is assigned to the log, it is easier to understand a state in which the anomaly is detected. As a result, the cost required for an analysis, such as determination of whether the detection result is true or false and attachment of a meaning of the detection result, can be reduced. Additionally, the occurrence of the false detection can be reduced by updating the detection algorithm in response to the determination of the false detection.

Although the vehicle 20 has been described as an example of the device in the present embodiment, the present embodiment may be applied to other devices having a communication function. For example, the present embodiment may be applied to an industrial control device such as a robot in a factory, sensors arranged at respective locations, an audio device, a home appliance, a communication terminal (e.g., a smartphone and a tablet terminal), and a device generally referred to as an Internet of Things (IoT) device.

As described above, according to the present embodiment, the feature context is assigned to the data (or log) generated in the vehicle 20 and transmitted to the monitoring server 10. The monitoring server 10 can reduce the cost required to analyze the log by storing the transmitted log in association with the feature context in the feature knowledge DB 173.

The monitoring server 10 can reduce the size of the log to be analyzed by an analyst or the like by registering the countermeasure that can be automatically performed in the feature knowledge DB 173.

The monitoring server 10 can reduce the occurrence of over-detection by changing the detection algorithm of the vehicle 20 when over-detection occurs, so that the over detection will not occur.

In the present embodiment, the vehicle 20 is an example of a device. The monitoring server 10 is an example of an information processing apparatus. The log receiving unit 151 is an example of a storage processing unit. The false detection and countermeasure determining unit 152 is an example of an analyzing unit. The countermeasure registering unit 155 is an example of a registering unit. The detection algorithm changing unit 153 and the detection algorithm transmission unit 154 are examples of a changing unit.

The embodiment of the present invention has been described in detail above. However, the present invention is not limited to such a specific embodiment, and various modifications and alterations can be made within the spirit and scope of the present invention as recited in the claims.

This international application is based on and claims priority to Japanese Patent Application No. 2018-192415, filed Oct. 11, 2018, the entire contents of which are incorporated herein by reference.

LIST OF REFERENCE SYMBOLS 10 monitoring server
20 vehicle
30a service providing server
30b service providing server
100 drive device
101 recording media
102 auxiliary storage device
103 memory device
104 CPU
105 interface device
151 log receiving unit
152 false detection and countermeasure determining unit
153 detection algorithm changing unit
154 detection algorithm transmission unit
155 countermeasure registering unit
171 control log DB
172 sensor log DB
173 feature knowledge DB
174 detection algorithm DB
210 communication device
221 CPU
222 memory device
223 auxiliary storage device
224 display device
225 input device
220 information subsystem
230 control subsystem
231 microcomputer
240 gateway
251 control log obtaining unit
252 sensor log generating unit
253 anomaly determining unit
254 feature context generating unit
255 log transmission unit
256 detection algorithm receiving unit
271 control log DB
272 sensor log DB
273 detection algorithm DB
B bus

The invention claimed is:

1. An information processing apparatus comprising:
a processor; and
a memory storing program instructions that cause the processor to:
store, in a storage unit, first data output by a device or any one of a plurality of devices in association with a first feature context related to the first data, wherein the first data represents log data obtained in response to the device operating, and the first feature context related to the first data indicates a state associated with the device at a time of the log data being generated or acquired by the device; and
obtain a second feature context related to second data in a case where the second data is received from the device or any one of the plurality of devices, and analyze an anomaly of the received second data based on the received second data and the obtained second feature context and based on the first data and the first feature context stored in the storage unit,
wherein first anomaly information is calculated, the first anomaly information indicating a degree of anomaly of the first data,
wherein the processor registers, in the storage unit, the first anomaly information in association with the first data or the first feature context,
wherein the receiving of the second data is subsequent to the storing of the first data, and
wherein the anomaly of the received second data is analyzed based on the first anomaly information stored in the storage unit.

2. The information processing apparatus as claimed in claim 1, wherein the program instructions further cause the processor to register, in the storage unit, a countermeasure to be performed on the first data in association with the first data or the first feature context.

3. The information processing apparatus as claimed in claim 2, wherein the processor extracts, from the storage unit, data that is identical or similar to the received second data, or a feature context that is identical or similar to the obtained second feature context, and outputs a countermeasure for the extracted data or the extracted feature context.

4. The information processing apparatus as claimed in claim 1, wherein the program instructions further cause the processor to change, based on an analysis result obtained by the analyzing unit, a detection algorithm of the device that outputs the second data.

5. The information processing apparatus as claimed in claim 1, wherein each of the first feature context and the second feature context includes at least one of a spatial feature context indicating an external environment of a device, a temporal feature context indicating a time when a device outputs data, or a behavioral feature context indicating a behavior of a device.

6. The information processing apparatus as claimed in claim 1, wherein the processor applies a weight in accordance with a feature context.

7. An anomaly analysis method to be performed by an information processing apparatus, the method comprising:
    storing, in a storage unit, first data output by a device or any one of a plurality of devices in association with a first feature context related to the first data, wherein the first data represents log data obtained in response to the device operating, and the first feature context related to the first data indicates a state associated with the device at a time of the log data being generated or acquired by the device; and
    obtaining a second feature context related to second data in a case where the second data is received from the device or any one of the plurality of devices, and
    analyzing an anomaly of the received second data based on the received second data and the obtained second feature context and based on the first data and the first feature context stored in the storage unity,
    wherein first anomaly information is calculated, the first anomaly information indicating a degree of anomaly of the first data,
    wherein the processor registers, in the storage unit, the first anomaly information in association with the first data or the first feature context,
    wherein the receiving of the second data is subsequent to the storing of the first data, and
    wherein the anomaly of the received second data is analyzed based on the first anomaly information stored in the storage unit.

8. A non-transitory computer-readable recording medium having stored therein the program instructions for causing the processor to function as the information processing apparatus claimed in claim 1.

9. The information processing apparatus as claimed in claim 1, wherein the log data includes data related to communication performed by the device.

10. The information processing apparatus as claimed in claim 1, wherein the log data includes data obtained from a sensor.

11. The information processing apparatus as claimed in claim 1,
    wherein the processor extracts the first anomaly information stored in association with the first data or the first feature context, in response to determining that the first data is identical or similar to the second data, or the first feature context is identical or similar to the second feature context, and
    wherein the anomaly of the received second data is analyzed based on the extracted first anomaly information stored in the storage unit.

* * * * *